United States Patent [19]
Weber

[11] Patent Number: 5,220,968
[45] Date of Patent: Jun. 22, 1993

[54] PRODUCTIVITY MONITORING SYSTEM FOR LOADING MACHINERY

[76] Inventor: Steven J. Weber, 10646 Winfield Loop, Manassas, Va. 22110

[21] Appl. No.: 848,690

[22] Filed: Mar. 9, 1992

[51] Int. Cl.$^5$ .................... G01G 19/40; G01G 19/08
[52] U.S. Cl. ................................. 177/25.14; 177/139; 364/567
[58] Field of Search ............................. 177/136–141, 177/25.14; 364/567

[56] References Cited

U.S. PATENT DOCUMENTS

| | | | |
|---|---|---|---|
| 4,281,729 | 8/1981 | Farley et al. | 177/139 |
| 4,677,579 | 6/1987 | Radomilovich | 364/567 |
| 4,809,794 | 3/1989 | Blair | 177/139 |
| 4,845,648 | 7/1989 | Hagenbuch | 177/136 X |
| 4,919,222 | 4/1990 | Kyrtsos et al. | 177/139 |
| 4,995,468 | 2/1991 | Fukuda | 177/139 |

Primary Examiner—George H. Miller, Jr.
Attorney, Agent, or Firm—Richard C. Litman

[57] ABSTRACT

A device for loading and moving loads, for example, a wheeled loader, track type loader, shovel loader, crane, scraper, back hoe, etc., is equipped with various sensors for determining when a load is being moved and what the weight and volume of the load is. The data from the sensor is buffered and supplied to a microprocessor. This is done for a period of time as the operator uses the loading device. The data accumulated for each load moved by the operator is used to determine the efficiency of the operator in using the device. A display provides the operator with various information regarding the load being moved, such as its weight and volume, or the total weight and volume of several loads delivered to a particular location, etc. The same display can be used to provide data regarding the efficiency and productivity of the operator during a work period. A printer is also provided to print out the data.

16 Claims, 4 Drawing Sheets

| RANGE | DENSITY |
|---|---|
| A (2ND CNTR) | GROSS |
| B (1ST CNTR) | TASK |
| W AND V | LOAD |

FIG. 5

PRODUCTIVITY MONITORING SYSTEM FOR LOADING MACHINERY

BACKGROUND OF THE INVENTION

1. Field Of The Invention

This invention relates to a system used to determine the productivity and efficiency of an operator using loading machinery, such as wheeled loaders, track type loaders, scrapers, back hoes, cranes, shovel loaders, etc. The system will provide the operator with information regarding each load such as the weight and volume of the load being carried, the total volume and weight of the load delivered to a particular location, and how much more of the load should be delivered to that location.

2. Description Of The Related Prior Art

In industry, it is often necessary to know the quantity of raw or manufactured materials transported into or out of a plant or business. Such information is used for billing purposes, providing the client with the exact amount requested, regulating the maximum weight of trucks on the road, limiting the quantity of material used in a manufacturing process, etc. One way to regulate the weight is to use scales in which the material is brought to the scales, placed on the scales, and weighed. In some cases it may be necessary to add more material or subtract from it and the location to load the material and the location of the scales are sometimes different, for example in the case of transporting bulk materials by truck to and from a manufacturing plant. Such procedures are time costly.

However, in the prior art, there are known devices which allow for the dynamic measuring of the quantity of material as it is being loaded and moved.

U.S. Pat. No. 4,281,729, issued on Aug. 4, 1981, to James E. Farley et al. is concerned with the precise measuring of raw materials while the material is transported by a bucket to a furnace.

U.S. Pat. No. 4,809,794 issued Mar. 7, 1989 to James R. Blair et al. discloses an apparatus for measuring the quantity of material delivered per cycle by measuring the quantity of material delivered per cycle by a shovel loader.

U.S. Pat. No. 4,919,222 issued Apr. 24, 1990 to Christos T. Kyrtsos et al. discloses a dynamic payload monitor for determining the weight of a load by curve fitting the sensed cylinder pressure of the lift arm cylinders and then displaying the weight as well as the total weight measured.

U.S. Pat. No. 4,995,468 issued Feb. 26, 1991 to Masao Fukuda, discloses a load weight measuring system in which the weight of each load is measured as it is transported to a particular location and the weight of each load is subtracted from a total desired weight to be delivered to that particular location, thereby informing the operator of the loader how much more material is to be delivered to that location.

Japanese Patent No. 59-80841 to Mamorv Arazeki, issued May 5, 1984, and Japanese Patent No. 59-85047 to Jiyun Arazeki, issued May 16, 1984, disclose a device for determining the actual number of operating times and the total operating time of a bulldozer or the like.

None of the above disclosures show using the accumulated weight and volume of material delivered during a working period to determine the efficiency and productivity of the operator of the loader. For example, in earth moving operations, a cost estimate for moving a given quantity of bulk dirt has to be determined by estimating the overall cost of moving each cubic yard of earth. This estimate is necessary for determining a bid for a contract and is done in part by knowing approximately how many cubic yards of earth an operator generally moves per unit time with a particular loader. In order to come up with a dependable approximation of the overall cost to accomplish a given job, an estimator relies on experience in past field operations. Typically, the estimator might stand in the field for an hour and watch a scraper work. Knowing the loaded capacity of a scraper in cubic yards, the estimator approximates the quantity of earth in each load and totals it over an hour to come up with a per day production figure. Such operations are time costly and not very accurate. The device of the present invention would enable an estimator to make a more valid approximation.

SUMMARY AND OBJECTS OF THE INVENTION

Accordingly, one object of the present invention is to provide a device for monitoring the total weight and volume of material moved by an operator of a loader during a working period to determine the efficiency of the operator in using the loader.

Another object of the present invention is to provide a device for monitoring the total number of times a load was moved by the operator and the amount of time it took to help determine the efficiency of the operator.

Another object of the present invention is to allow the operator to know the volume and weight of each load being moved.

Still another object of the invention is to use data derived above as well as other data to calculate, display and print the efficiency of the operator, including how many loads per unit time the operator moved and the total weight and volume of material moved within the working period.

The present invention provides for sensors used to derive various parameters of the loader while in use, such as the hydraulic pressures detected in the lifting members of a wheeled loader or the strain determinations of the lifting members of a shovel loader, along with data regarding the positions of the various load lifting and load moving members. This data is supplied to a controller and can be used to determine when a full load is loaded, as opposed to a partial load while loading or unloading, and the weight of the full load. The controller can be a microprocessor provided with program storage memory, for example ROM, for loading the microprocessor with the program for processing the data. Data is also stored and retrieved by the microprocessor using data storage memory, for example RAM. The microprocessor receives data and instructions from a keypad and can display data as well as print data.

DETAILED DESCRIPTION OF THE PREFERRED EMBODIMENT

Figure 1:
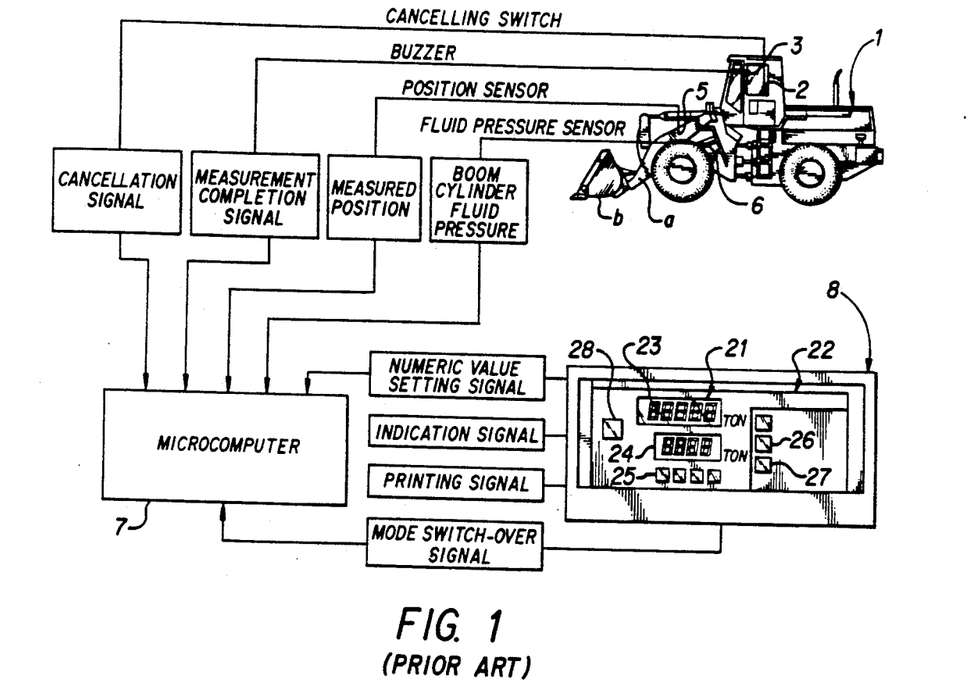
FIG. 1 is a schematic of a weight measuring system used in combination with the wheeled loader as is known in the prior art.

In the prior art of FIG. 1, a material weight measuring system used while the wheeled loader 1 is in operation is disclosed. Sensors are placed on the loader including a position sensor 5 used to indicate the position of the lifting arm and a fluid pressure sensor 6 used to detect the pressure in the cylinder which moves the lifting arm (a). When the position sensor 5 indicates that the lifting arm (a) is fully elevated, then the pressure indicated by sensor 6 is used to calculate the weight of the load by a microcomputer 7. A buzzer 3 is also sounded to indicate to the operator that the load has been measured. Note that the weight of the bucket (b) is not considered part of the weight of the load and the pressure detected by the sensor 6 when the bucket (b) is empty and fully elevated, when button 28 of the weight instrument 8 is pushed, is calibrated to indicate a weight load of zero.

The weight instrument 8 uses a display 21 to display to the operator information regarding the weight of the load in the bucket (b), (indicator 24), and the weight of the remaining material to be loaded to the particular location (indicator 23). Various control switches (25, 26 and 27) are provided on instrument 8 for allowing the processor to vary the way in which the data is displayed. Canceling switch 2 is used to indicate to the microcomputer 7 that the load is to be delivered to a new location, thereby resetting the total weight to be delivered. Further description of the device of FIG. 1, can be found in U.S. Pat. No. 4,995,468 to Fukuda, incorporated herein by reference.

Figure 2:
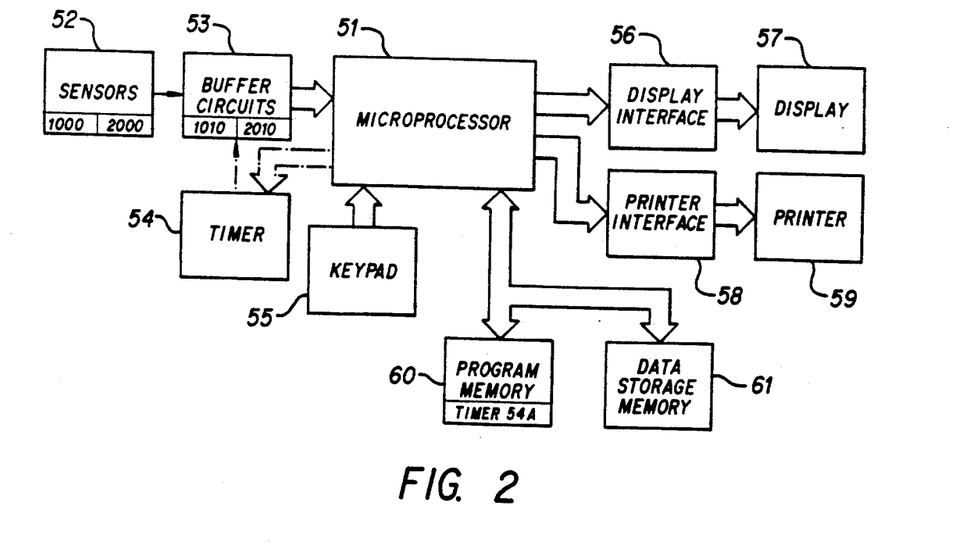
FIG. 2 is a schematic diagram of a weight measuring system of the present invention adapted to calculate the efficiency of the operator in using the loader.

In the weight measuring system of the present invention, as illustrated in FIG. 2, sensors 52 are provided to indicate the weight of a load which a loader is to move from one location to another location. The nature and placement of the sensors to indicate the weight of a full load is known to those skilled in the art and is dependent upon the particular type of loader used. For example, the sensors 52 could be a position sensor (1000), fluid pressure sensor (2000), and a reset switch (part of keypad 55) as used in Fukuda as described above where the loader is a wheeled loader. However, the loader could be a shovel loader as described by Blair et al. or a tiltable hopper as described by Farley et al., all prior art of record.

The particular sensors needed in order to detect the weight of a load is dependent on the type of loader used. It would be within the scope of those skilled in the art to modify the prior art to detect the weight of loads moved by cranes, back hoes, etc.

Figure 3:
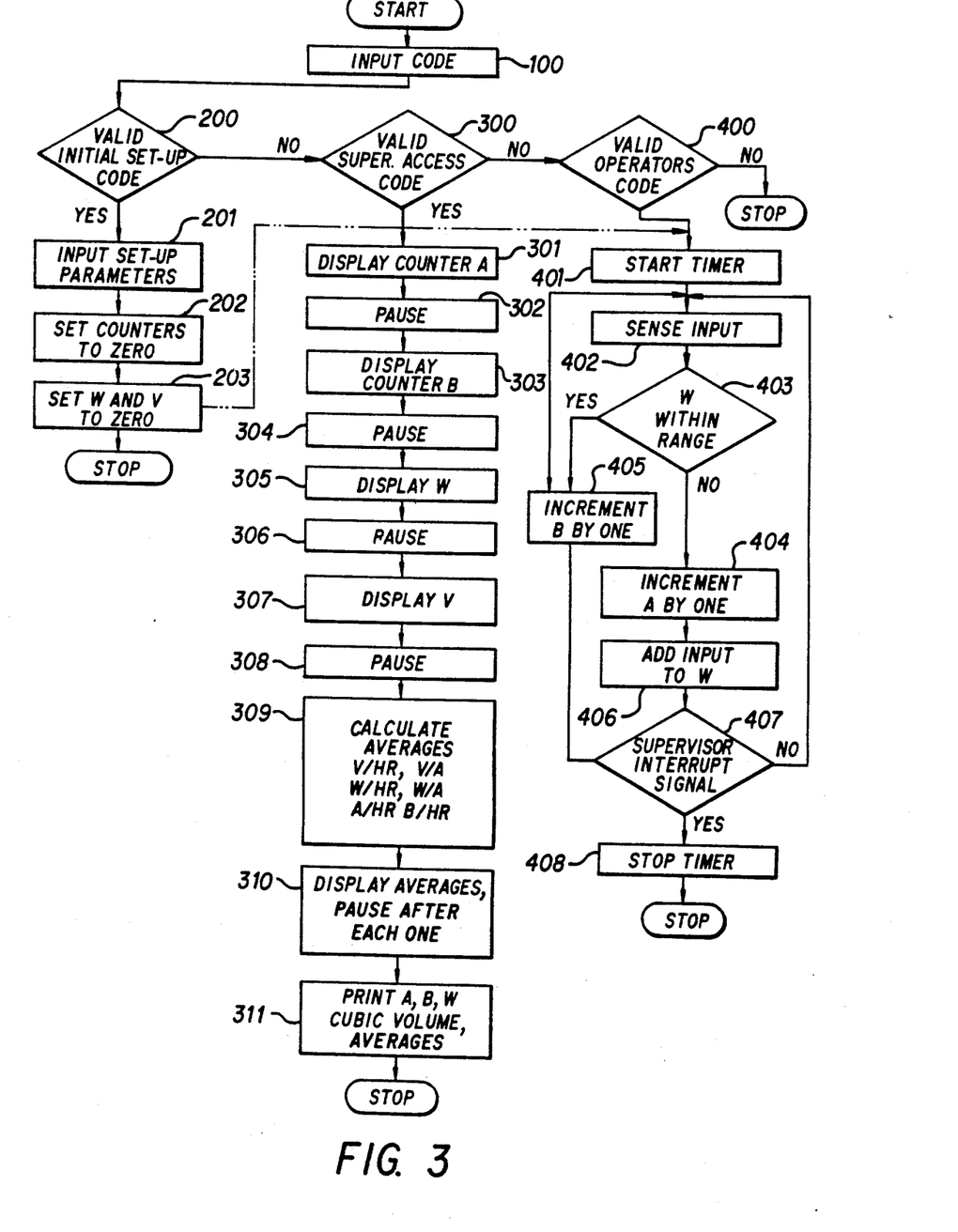
FIG. 3 is a flowchart of the program stored in the program memory of FIG. 2 and executed by the microprocessor.

In any case, the particular type of sensors used is not relevant to the present invention. In FIG. 2, sensors 52 are used to determine by the microprocessor 51 the weight of the load when fully loaded and ready to be moved by a loader. The particular algorithms which could be used by the microprocessor 51 to determine the weight from the data provided by the sensors 52 is known by those skilled in the art. For example, see Kyrtsos et al., prior art made of record. Buffers 53 are used to provide meaningful digital data to the microprocessor 51 from the various analog sensors 52. For example, buffers 1010 and 2010 provide information regarding the position of lifting arm (a) and the weight of the load, respectively. Program memory 60 is nonvolatile memory, for example ROM, on which the program for processing the input data is stored. The algorithm for this program is illustrated in FIG. 3 and will be discussed later. Data storage memory 61 is used to store and retrieve data used in the calculations performed by the microprocessor 51, for example a section of RAM dedicated exclusively for data storage. A display 57 is used to indicate to the operator during a working period the weight of a load being moved or the number of units moved if the load is not bulk material, for example pipes. Such a display could be a CRT, LED display, LCD, etc. For example, a row of eight of seven segment LCD's with decimal points could be used. The display interface 56 would control the row of LCD's to display in decimal form the digital data provided by the microprocessor 51.

At the end of a work period, a supervisor can determine the operator's work efficiency by using the keypad 55 to request from the microprocessor 51 a history of the operator's tasks completed during that work period. This history could be printed out by printer 59 using the printer interface 58 as the output buffer. Such a history would include how many loads were moved, the weight of the material moved if the material is a bulk material, and the volume of the bulk material moved. The volume of bulk material is calculated by knowing the density of the bulk material. Whether or not a load is a bulk material or not is determined by the microprocessor 51 by comparing the weight of the load with a range value set to be the approximate weight of the non-bulk material. For example, if a loader is used to move bulk material and then used to move pipes, the weight of the pipe or pipes placed into the bucket would be within the range value and would not be added to the total weight of bulk material moved. A separate counter (1st counter) is used to count the number of loads B moved which were not bulk material. This information is also provided to the supervisor. The supervisor is also given the average weight, volume and number of loads of bulk material moved per hour during the working period. The supervisor is also given the number of pipes moved per hour as well as the amount of bulk material in weight and volume moved per load. A timer 54 or 54A is used in the present invention to provide real time data to the microprocessor 51 so as to calculate the above averages involving time. This timer could be a software timer 54A stored in program memory 60, or optionally, an external timer 54 which would provide elapsed time since reset by the microprocessor 51.

In earth moving operations, the above data from the printout can be used to establish quantities for payment. In an earth moving contract, the standard unit price is in cubic yards. In general, topographical surveys are performed before a job is started and after a job is completed. The client will determine the quantity of excavating from these surveys and then multiply this quantity by the unit price to come up with the proper payment. Since the device of the present invention accurately measure weight and volume, it eliminates the need for surveys. The contractor simply provides the client with a copy of his daily printouts till the job is completed. The total volume of bulk material, e.g., dirt, moved each day is tabulated to determine the quantity of excavation for billing purposes.

Figure 4:
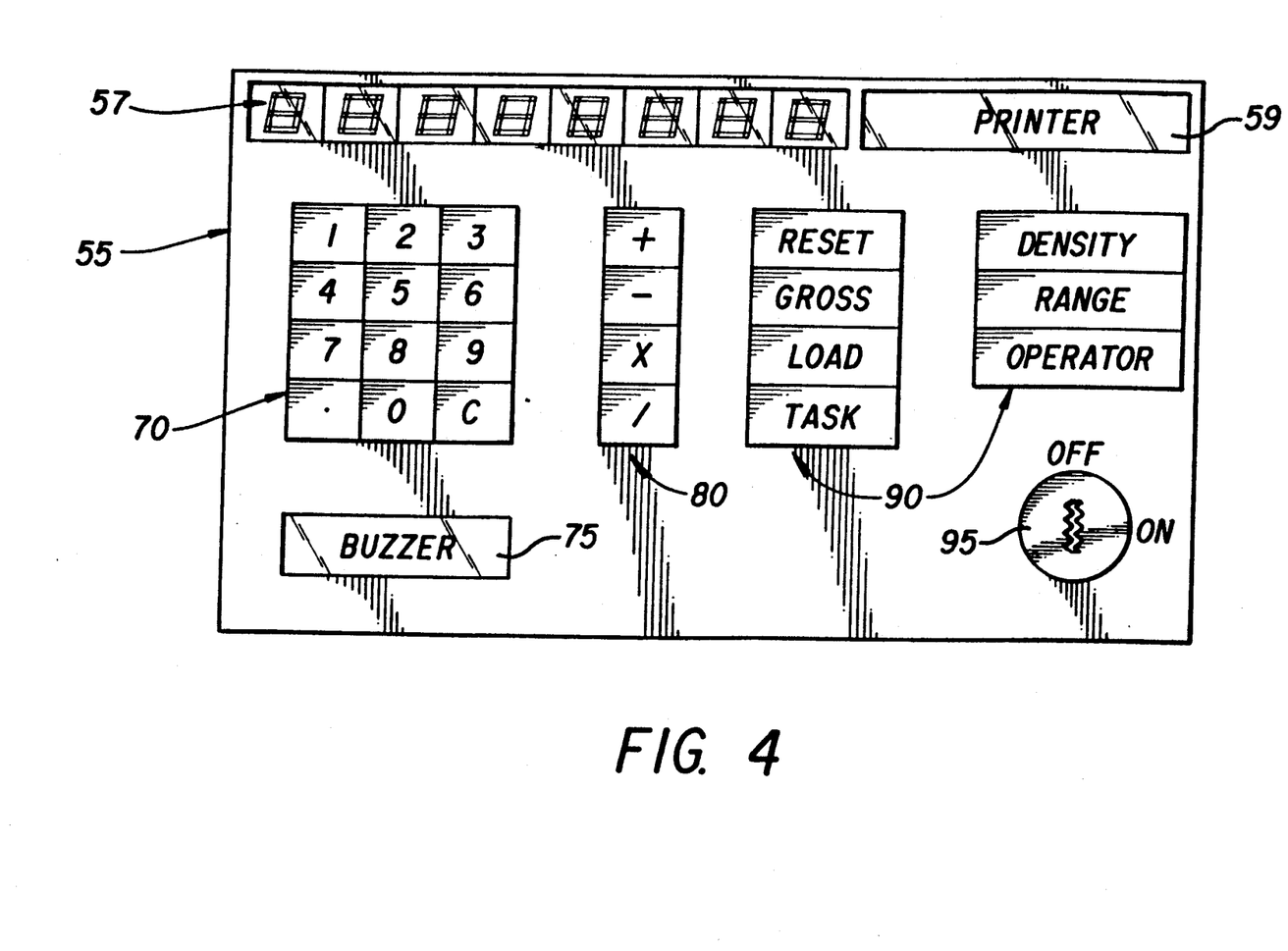
FIG. 4 is a diagram of the keypad used in the preferred embodiment.

FIG. 3 shows the preferred mode of operation of the present invention. When the loader is turned on, and the microprocessor 51 is initially powered up it waits for an input via keypad 55. The input has to be a valid code to initiate either an initial set-up mode, supervisory access mode, or the operator's mode. The input code could be a string of digits of a certain combination entered on a numeric section of the keypad. For example, the keypad 55 would have a numeric section 70 with buttons to enter in a decimal number 0-9 when punched a first time and any real integer by pushing other buttons thereafter, as is notoriously well-known in the art. Other keys on the keypad 55 could include a decimal point to enter fractions, operation buttons 80 and command instruction buttons 90. For example, in the preferred embodiment the keypad 55 is provided with a numeric section 70 including a decimal point, and a supervisory input code switch which is activated by a keylock 95. Upon inserting and turning the keys to the "on" position, a signal is sent from the keypad 55 to the microprocessor 51 to indicate that a supervisor is going to initiate either an initial "set-up" mode by entering in the number 1 on the keypad 55 or the "supervisory access mode" by entering in the number 2 on the keypad 55. The microprocessor 51 is now waiting for an input code (see step 100 of FIG. 3). If a 1 is entered, than at step 200 a valid initial set-up code is detected. The program of the microprocessor 51 than executes step 201 of the flowchart. In step 201, input set-up parameters are input into the computer 51. In the preferred embodiment this includes the density of the bulk load to be loaded. This density is used later to determine the volume of bulk material moved by the operator. The average or approximate weight per cubic yard of soil types could be used to determine the volume if the bulk material is soil. The methods use to determine this volume is not a part of the present invention, but is within the scope of those skilled in the art.

Figure 5:
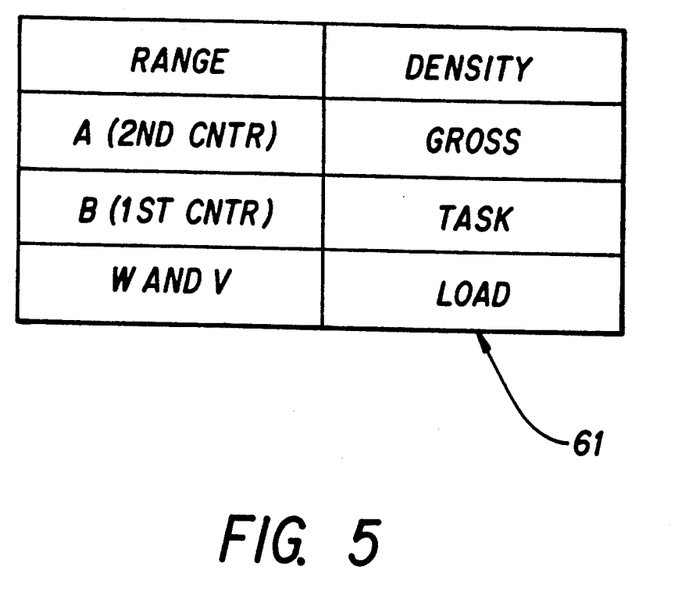
FIG. 5 is a diagram of memory allocations allotted in data storage memory 61.

In step 201, the supervisor enters the density by operating the keypad's numeric section 70. If an error is made, that error can be cleared by pressing the "C" button. The numbers entered are displayed on the display 57 as they are entered. Once the correct number is displayed the supervisor then pushes the "density" button to enter the data displayed as the new density number (see FIG. 5). If zero is displayed on the display 57, the present density value stored in memory is displayed when the "density" button is pressed but no new density value is stored. Once a new density value is stored, the supervisor enters the range of the weight of the non-bulk material, for example, pipes. This is done by entering the lower limit of the range, pressing the decimal point, and then entering the upper limit of the range. This is done on the keypad's numeric section 70. If an error is made, that error can be cleared by pressing the "C" button. The numbers entered are displayed on the display 57 as they are entered in the same manner described above for entering the density. The range data is stored in the same manner as the density data was stored, except that the "range" button is pressed instead. Likewise, if zero is displayed on the display 57, the present range value stored in memory is displayed when the "range" button is pushed. After the range value is stored, the program advances to step 202 which resets a first counter (B) to zero. In the first counter, the value B represents the number of non-bulk loads moved. Also a second counter with the value A representing the number of bulk material loads moved is reset to zero. The total accumulated weight and volume, W and V, respectively, of the bulk material loaded during a working period are reset to zero in step 203. All values above are stored in data storage memory 61. As illustrated in FIG. 5, all values have a designated location within data storage memory 61. This ends the initial set-up mode.

From step 203, the logic flow could proceed directly to step 401 of the operator's mode. In the preferred embodiment the operator begins his/her shift by pressing the "operator" button on the keypad 55. Note, that the supervisor should turn off the key to the supervisory input code switch and remove the key to prevent the operator from accessing the initial set-up mode or supervisory access mode. Once the operator has started his/her shift and pressed the "operator" button, the program detects the pressed button as the valid operator's code and proceeds to step 401 and starts the timer 54 or 54A to accurately measure the elapsed time from the beginning of an operator's shift. In step 402, the weight of a load to be moved by the loader is detected. Once the buzzer 75, preferably connected to the display 57, sounds, the operator knows that the load is weighed. The volume of the load is then calculated by the microprocessor 51 and both weight and volume are displayed to the operator as described below.

Once the load is weighed in step 402, it is determined in step 403 whether or not the load is within a given range. If not, the load is a bulk material and the second counter A of data storage memory 61 is incremented by one (step 404) and the accumulated weight W is increased by the value of the weight of the load (step 406). The accumulated volume, V, is increased by the volume of the load as calculated above. Otherwise, the value in the first counter, B, is incremented by one (step 405). After each of these steps it is determined whether or not a supervisor wishes to interrupt (407). If the keylock 95 is turned "on" in this step, and the supervisor wishes to interrupt, the timer is stopped (step 408) and the microprocessor 51 is again waiting for an input code (step 100). The supervisor now may wish to determine the operator's efficiency during his work period. By pushing the number 2 key, the program enters the supervisory access mode (step 300-313) to be described later. This mode will not change any of the stored values affecting the operator's efficiency. After step 313 the microprocessor 51 is again waiting for an input code (step 100). When the operator is ready to continue, the "operator" button is pushed. In step 407, the microprocessor 51 waits for a supervisor interrupt signal until another load is weighed. Then the program returns to step 402 to determine what the weight and volume of the load is and the cycle continues. While each load is loaded and the weight is determined and from that the volume, the weight and volume of each load is shown to the operator on display 57. The weight and volume of the load is displayed simultaneously by dedicating a portion of the display 57 for displaying only weight while another portion displays only volume.

If the operator is given a task to deliver a certain amount of material to a particular location then, he/she enters the amount using the numeric section 70. The value is displayed and may be cleared from the display 57 by pushing "C". Once the displayed value is correct, the operator enters this value into the computer 51 by processing the "Task" button. This value is stored in the data storage memory 61. Again, if all zeros appear on the display 57, the task value stored in memory 61 is displayed when the task button is pushed. As the operator moves loads to the particular location, the accumulated gross load moved to that location is also stored. This data is available to the operator by pressing the "Gross" button. The amount of the load still needed to be delivered to a particular location can be calculated by subtracting the "Gross" value from the "Task" value. This value can be displayed to the operator upon the actuation of the "Load" button. All of the "Gross", "Task", and "Load" values are displayed only for a few seconds, say five, before the value of the present load is again displayed. Upon pushing the "Reset" button the values of "Gross" and "Load" are set to zero.

The supervisory access mode of the present invention will now be described. Upon turning the keylock 95 to the "on" position and pressing 2 when the program is in step 100, the valid supervisor's access code is detected in step 300. The value of A is displayed for a certain amount of time (steps 301 and 302). Then the value B is displayed for a certain amount of time (steps 303 and 304). Next the value W is displayed for a certain amount of time (steps 305 and 306). The volume is also displayed for an amount of time (steps 307 and 308). The average weight and volume of bulk material transported per hour are then calculated by dividing separately the accumulated weight W and the accumulated volume V, respectively, each by the accumulated time as indicated by the timer (see step 309). The average weight and volume of bulk material transported each time a load was moved by the loader during an operation's working period are also calculated by separately dividing the accumulated weight W and the accumulated volume V, each by the value A. Then the average number of bulk material loads and non-bulk material loads moved per hour are calculated by dividing the value A and B, each separately, by the elapsed time. These averages are also displayed separately for an amount of time. All of the above mentioned amounts of times for displaying are generally a few seconds. Next the values of A, B, W, V, and the averages are printed out by printer 59 once these values are passed to printer interface 58. (See step 311).

While a preferred embodiment has been set forth in detail, minor modifications can be made thereto that are within the scope of the invention. For example, a hardwire digital circuit controller could be used as a substitute for the microprocessor controller. The data storage memory could include tape or disc drives. The keylock 95 could be a card reader with a coded magnetic strip, etc. Such modifications or substitutions of analogous parts are within the scope of the present invention.

It is to be understood that the present invention is not limited to the sole embodiment descried above, but encompasses any and all of the embodiments within the scope of the following claims.

I claim:

1. A loading device comprising:
   lifting means controlled by an operator for loading and unloading a plurality of loads using a container attached to said lifting means;
   weight sensor means connected to said lifting means for outputting a weight signal indicative of the weight value of a load within said container;
   converter means for producing a volume value based on said weight value;
   memory means;
   controller means;
   a timer;
   means for starting said timer before monitoring said weight sensor means;
   means for stopping said timer in response to an interrupt signal input to said controller means;
   a first counter stored in said memory means, used to indicate a first part of the operator's calculated efficiency;
   a second counter stored in said memory means, used to indicate a second part of the operator's calculated efficiency;
   means for dividing the value in the second counter by the timer value for calculating the load rate; and
   said controller means including means for storing in said memory means an accumulated total of the weight value and an accumulated total of the volume value of each of said plurality of loads as they are loaded into said container and means for calculating the operator's efficiency based on said accumulated total of the volume value stored in said memory.

2. A loading device as claimed in claim 1, further comprising:
   a display for displaying data;
   a keypad for inputting data and instructions to said controller means;
   said controller means further comprising means for selectively displaying on said display the weight and volume of a load in the container, the accumulated total of said weight and volume signals, and the calculated operator's efficiency in response to keypad instructions.

3. A loading device as claimed in claim 2, wherein said controller means further comprises;
   means for detecting a valid access code as part of said keypad instructions;
   means for disabling said means for displaying the calculated operator's efficiency if a valid access code is not detected as part of said keypad instructions.

4. A loading device as claimed in claim 3, further comprising:
   a printer; wherein
   said controller means further comprises means for enabling said printer to print the calculated operator's efficiency if said valid access code is detected.

5. A loading device as claimed in claim 4, wherein said converter means comprises:
   means for storing a load density value in said memory means; and
   means for dividing the weight value by said load density value in order to obtain said volume value.

6. A loading device as claimed in claim 4, further comprising
   a range value stored in said memory means; and
   wherein said controller means further includes:
     means to compare a weight signal to the range value;
     means to increment the first counter by one if the comparison indicated that the magnitude of the weight signal is within the range value; and
     means to increment the second counter by one if the comparison indicates that the magnitude of the weight signal is outside of the range value.

7. A loading device as claimed in claim 6, wherein said controller means further comprises:

means for determining when said second counter is incremented by one;

means for adding the value of the weight signal to said accumulated total of weight signals after said second counter is incremented by one, and means for adding the value of the volume signal to said accumulated total of volume signals after said second counter is incremented by one.

8. A loading device as claimed in claim 6 wherein said controller means further comprises means for enabling said printer to print the load rate as part of the operator's efficiency.

9. A loading device as claimed in claim 8, wherein said controller means further comprises:

reset counter means for resetting to zero the first counter, the second counter, and said accumulated total of weight values, and said accumulated total of the volume values;

timer reset means for resetting the timer to zero; and load density value changing means for displaying the load density value and for storing the data from the keypad as the load density value in response to keypad instructions.

10. A loading device comprising:

a container;

a lifting means attached to said container and controlled by an operator for loading and unloading loads into and out of said container;

a controller;

weight sensor means connected to said lifting means for outputting a weight signal to said controller indicative of the weight value of a load in the container;

loaded sensing means for indicating to the controller when the container is completed empty or has a load therein;

a keypad for inputting data and instructions to said controller;

a display connected to said controller for displaying data output by said controller;

a printer connected to said controller for printing data output by said controller;

first counter storage means connected to said controller for storing a first counter therein, second counter storage means connected to said controller for storing a second counter therein;

accumulated weight and volume storage means connected to said controller and having a first and second portion therein;

range value storage means connected to said controller for storing a range value therein;

load density value storage means connected to said controller for storing a load density value therein; and a timer connected to said controller for indicating the elapsed time the loading device is operated;

wherein said controller has, means responsive to said weight sensor for converting said weight value, indicative of said weight signal, to a volume value by dividing said weight value by said load density value;

means for monitoring for a valid initial set-up code, a valid supervisors access code, and a valid operators code in which the valid initial set-up code may be the same or different from the valid initial operators code, an initial set-up means activated by said controller in response to receiving a valid initial set-up code for resetting the first counter, the second counter, and the accumulated total as well as the timer, said initial set-up means further selectively displaying on said display and changing the contents of the range value storage means and load density value storage means in response to keypad instructions, a supervisor data access means activated by said controller in response to receiving a valid supervisor data access code for displaying and printing the values of the first counter, second counter and accumulated total, said supervisor data access means further comprising means to calculate average load rates using the data in the first and second counters as well as the elapsed time, means to calculate the average weight and volume delivered for each load as indicated by the first counter storage means as well as the second counter storage means, supervisor data access means further enabling said display and said printer to display and print, respectively, the results of all calculated averages, an operator means activated by said controller in response to receiving a valid operator code for starting said timer and monitoring the weight signal including means for comparing the weight signal with the range value when the container is loaded as indicated by the loaded sensing means and means responsive to said comparison for selectively incrementing said first counter by one when the weight of the load is within the range value as indicated by the comparison and for incrementing said second counter by one, adding the weight value to said first portion of said accumulated weight and volume storage means, and the volume value to said second portion of said accumulated weight and volume storage means when the comparison indicates that the weight of the load is outside of the range value.

11. A method of determining the efficiency of an operator of a loader during a work period, said loader comprising a container such as a back hoe bucket or loader bucket, said method comprising the steps of:

monitoring the weight of the loads;

converting each weight to a volume;

tabulating a total of the weights loaded;

tabulating a total of the volumes loaded;

running a timer while the loader is operated during a work period;

determining whether access to the information regarding the efficiency of the operator is allowed;

stopping the timer if access to the information is allowed;

calculating a first load rate based on the counted number of loads tabulated, a second load rate based on the number of loads not tabulated, wherein both said first and second load rates are calculated using the time the loader was operated during a work period as indicated by the timer; and determining the efficiency of the operator based on the tabulated weights and volumes.

12. The method of claim 11, further comprising the steps of:

storing a range value, comparing the weight of each load to said range value, and adding the weight and volume of the load to the tabulations of the total of weights and volumes, respectively, if the comparison indicates that the weight of the load is outside of the range value.

13. The method of claim 12 further comprising the steps of:
separately counting the number of loads tabulated and not tabulated, each count being an indicator of the efficiency of the operator.

14. The method of claim 13, further comprising the steps of:
determining whether access to the information regarding the efficiency of the operator is allowed;
displaying the tabulated weights and volumes as well as the counted number of loads tabulated and separately, the count of the number of loads not tabulated after determining that access is allowed;
producing a printout of the tabulated weights and volume as well as the counted number of loads tabulated and not tabulated.

15. The method of claim 13, further comprising the steps of:
displaying the first and second load rates, and printing the first and second load rates.

16. The method of claim 13, further comprising the steps of:
setting the tabulations of the weights and volumes, the count of the number of loads tabulated and the count of the number of loads not tabulated to zero at the end of a work period.

* * * * *